Nov. 10, 1959   H. C. RIGGS ET AL   2,911,986
VENT PLUG
Filed Aug. 11, 1955

INVENTORS
HAROLD C. RIGGS
FREDERICK J. PORT

BY

ATTORNEY

United States Patent Office 2,911,986
Patented Nov. 10, 1959

2,911,986

VENT PLUG

Harold C. Riggs, Langhorne Manor, Pa., and Frederick J. Port, Cleveland Heights, Ohio, assignors to The Electric Storage Battery Company, a corporation of New Jersey Application August 11, 1955, Serial No. 527,824

2 Claims. (Cl. 137—43)

The invention relates to vent plugs for electric storage batteries, and particularly to that type of plug which is adapted to prevent spillage or leakage of electrolyte when the battery is inverted or tilted from the normal plane of use.

In certain fields of use of storage batteries, particularly in aircraft, the battery may become inverted thus creating a great hazard due to the possibility that the acid electrolyte will spill or leak from the cell. In this eventuality not only may the battery itself be harmed and the life thereof shortened by the presence of an insufficient quantity of electrolyte, but the vehicle itself may also be damaged by the acid lost from the battery.

This problem has long been known to storage battery manufacturers as well as airplane designers and the like. Certain constructions have heretofore been suggested, such as exemplified by U.S. Patent No. 2,306,974 issued to C. F. Oestermeyer et al. and assigned to the assignee of the present application, and U.S. Patent No. 2,405,736 issued to R. A. Daily et al. It has been found that the prime difficulty in the prior art constructions has been that, although the vent plugs were eminently satisfactory in operation while the battery was in its normal position, and furthermore that the plugs would satisfactorily prevent loss of electrolyte during inversion, the valves would not satisfactorily open when the battery returned to its normal plane. During the charging of a storage battery, particularly in periods of overcharge, the water in the electrolyte is converted to its elemental components such as hydrogen and oxygen. In normal operation, this gas will readily be vented to the atmosphere. However, while the battery is inverted during charge and the valves closed to prevent loss of liquid, the gases evolved by passage of the charge current cannot escape from the cell and a gas pressure is built up within the battery. Upon return of the battery to a normal position it is difficult for the valves to open against the back pressure and permit normal venting of the accumulated gases. If the valves do not open, pressure will build up on continued charge to a point where an explosion may well occur.

It is an object of the invention, therefore, to provide a non-spill type vent plug which will be effective in preventing the loss of electrolyte during inversion of the battery and containing valve members of such construction that they will readily open upon return of the battery to its normal condition even under conditions of extreme back pressure resulting from evolved gases.

Other objects of the invention will be apparent from the description and claims that follow.

Figure 1:
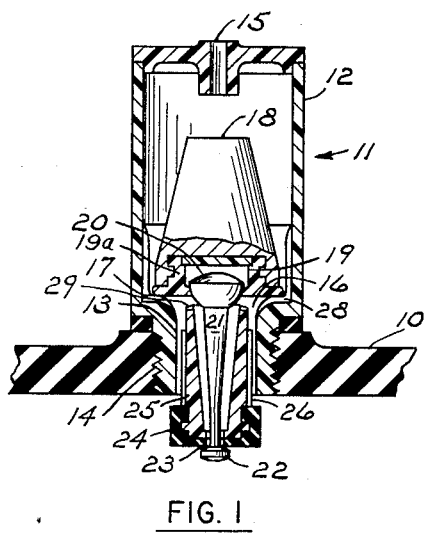
Figure 1 is an elevational view partly in cross section showing the vent plug in the normal or open position permitting escape of gases from the cell.

Referring now to the drawing the numeral 10 indicates generally the cover of a storage battery cell having a vent plug 11 inserted therein. The vent plug comprises generally a hollow body 12 terminating at its lower end in a reduced portion 13, the portion 13 being externally threaded as at 14 and connecting with corresponding threads on the cell cover 10. The body 12 is further provided with vent opening 15. Reduced portion 13 contains opening 16 connecting with the interior of the storage battery cell. Internally of hollow body 12 is seat 17 which is formed by the upper end of reduced portion 13.

Normally resting on seat 17 is a weight 18, the purpose of which will be hereinafter described, and which, although here shown to be substantially of frustro-conical configuration can be made in any desired form. Preferably weight 18 is formed of a heavy metal which is not affected by the battery electrolyte. Weight 18 is provided with an undercut portion 19 in which is retained the conical head 20 of valve stem 21 which extends downwardly through annular opening 16 into the storage battery cell. Valve stem 21 terminates below annular opening 16 in an enlarged valve head 22. Although other equivalent constructions can be used head 20 is preferably retained within weight 18 by a plastic framework 19a molded within undercut portion 19. Head 20 and valve stem 21 will generally be formed of a strong, acid resistant plastic and, as shown, the stem is desirably made with a downwardly extending taper to provide optimum strength.

Surrounding valve stem 21 and spaced to a slight extent therefrom so as to leave annular space 23 around said valve stem is a sliding valve 24. It will be noted by reference to Figure 1 that when the vent plug is in the open position sliding valve 24 rests on valve head 22, and that when the plug is closed (Figure 2) sliding valve 24 abuts the lower end of reduced portion 13 in sealing relationship therewith.

Sliding valve 24 is formed with an upstanding collar 25 surrounding and spaced from valve stem 21 thereby forming a continuation of annular space 23. Collar 25 bears a plurality of wings 26 on the external surface thereof which act as spacing members between said collar and the internal surface of reduced portion 13 to leave passage 27 between said collar and said reduced portion. It has been found desirable to construct sliding valve 24 and collar 25 as two separate pieces as shown in the drawing, collar 25 being formed from a hard, mechanically strong plastic like material and bearing a circumferential flange 25a near the lower end thereof. The valve member itself is preferably made of a soft rubberlike material and contains groove 24a. The valve member will be snapped on the lower end of collar 25 and be retained by the coaction of flange 25a and groove 24a.

Figure 2:
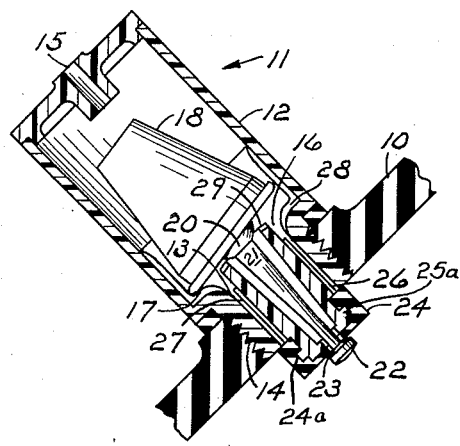
Figure 2 is a view similar to Figure 1 showing the vent plug in its closed position, as when the battery is tilted or inverted, in which position electrolyte is prevented from escaping from the cell.

By reference to Figure 1 it will be seen that when the battery is in an upright position weight 18 rests on seat 17 and sliding valve 24 is spaced from the bottom of reduced portion 13 and resting upon valve head 22. While the plug is in this position gases from the cell can normally escape around the sliding valve and upwardly through passage 27 between collar 25 and reduced portion 13. Thence, through channels 28 formed in seat 17, around weight 18 and pass out of hollow body 12 by way of vent opening 15.

Figure 3:
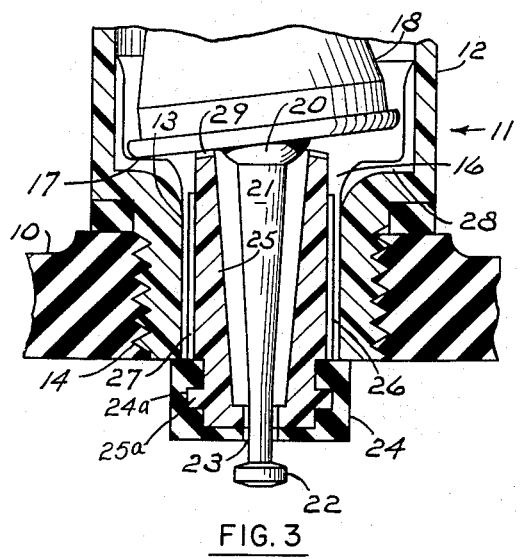
Figure 3 is an enlarged view similar to Figure 1 showing the lower portion of the vent plug in an intermediate position representing a stage following inversion of the battery, valve head 22 being partially open and sliding valve 24 still remaining in the closed position.

When the battery is tilted from the normal plane (Figure 2) weight 18 rocks upon seat 17 thereby exerting a force on valve stem 21 which, in turn, raises valve head 22 and forces sliding valve 24 into contact with the lower end of reduced portion 13 thereby sealing passage 27 to prevent escape of electrolyte therethrough. Upon return of the battery to its normal plane weight 18 will return to its position on seat 17 meanwhile forcing valve head 22 downwardly whereby annular space 23 between valve stem 21 and sliding valve 24 is opened (Figure 3). At the same time, during its return movement to seat 17, weight 18 strikes the top portion 29 of collar 25 thereby forcing sliding valve 24 away from the lower part of reduced portion 13 and opening passage 27.

If, during the inversion of the battery, gas pressure is built up within the cell to such an extent that sliding valve 24, being of relatively large surface area compared to valve head 22, cannot be opened against the back pressure of the gas, the preliminary opening of annular space 23 will permit the gas to escape through such space thereby decreasing the pressure and sliding valve 24 will then be opened by the pressure of weight 18 resting on the top portion 29 of collar 25. Portion 29 slants downwardly from the inner surface of collar 25 to provide an area of maximum contact between weight 18 and collar 25.

As a result of the above description it will be understood that there has been provided a vent plug which will not only seal automatically to prevent the escape of electrolyte if the battery is tilted from its normal plane but will automatically open upon return of the battery despite the fact that considerable gas pressure may have become built up within the cell. The drawings and the description herein set forth are only intended to be indicative of one form of this invention and other forms and variations coming within the scope of the appended claims will readily occur to those skilled in the art.

We claim:

1. A non-spill vent plug comprising a hollow body normally maintained in an upright position and having an opening through the lower end thereof, a weight positioned within said body and adapted for rocking motion when said body is tilted, a valve stem affixed to said weight and extending through said opening, a valve head affixed to the lower end of said valve stem, a sliding valve associated with said valve stem above said first valve head and forming a valve seat for said valve head, said sliding valve being provided with an upstanding collar spaced from said valve stem and from the walls of said hollow body and extending within said hollow body to an extent such that it is engaged by said weight when said body is in an upright position and said first valve head is unseated.

2. A non-spill vent plug comprising a hollow body normally maintained in an upright position and terminating in a reduced portion having an opening therethrough, a weight positioned on said reduced portion within said body and adapted for rocking motion when said body is tilted, a valve stem depending from said weight and terminating outside of said hollow body in a valve head, a sliding valve associated with said stem and resting on said valve head when said weight is seated upon said reduced portion, and a collar upstanding from said sliding valve and spaced from said valve stem and from said reduced portion, said collar extending into said hollow body above the reduced portion to a point adjacent said weight when said body is tilted, and a gas escape channel between said collar and said reduced portion when said weight is seated upon the reduced portion.

References Cited in the file of this patent

UNITED STATES PATENTS

| | | |
|---|---|---|
| 2,405,736 | Daily | Aug. 13, 1946 |
| 2,717,610 | Gill | Sept. 13, 1955 |